United States Patent [19]
Monsen

[11] Patent Number: 4,479,064
[45] Date of Patent: Oct. 23, 1984

[54] SAFE START SYSTEM FOR AUTOMOTIVE VEHICLES

[76] Inventor: Dee N. Monsen, 2312 Sunset, Caldwell, Id. 83605

[21] Appl. No.: 480,764

[22] Filed: Mar. 31, 1983

[51] Int. Cl.³ .............................................. B60R 25/04
[52] U.S. Cl. ................................ 290/37 R; 290/38 R; 307/10 AT
[58] Field of Search .................... 290/35, 37 R, 38 R; 307/10 AT, 113, 115, 141

[56] References Cited
U.S. PATENT DOCUMENTS

| | | | |
|---|---|---|---|
| 3,453,591 | 7/1969 | Perez | 307/10 AT |
| 3,544,804 | 12/1970 | Gaumer et al. | 307/10 AT |
| 3,614,458 | 10/1971 | Stein | 307/10 AT |
| 4,063,610 | 12/1977 | Shilling | 307/10 AT X |
| 4,318,005 | 3/1982 | Heckelman et al. | 307/10 AT |
| 4,418,330 | 11/1983 | Kamichik | 307/10 AT X |

Primary Examiner—J. V. Truhe
Assistant Examiner—W. E. Duncanson, Jr.
Attorney, Agent, or Firm—Harvey B. Jacobson

[57] ABSTRACT

Manually actuated switches mounted externally at spaced monitoring locations on a vehicle are actuated in sequence by a vehicle driver during inspection at each of such locations. Actuation of such switches triggers operation of timers having overlapping timing cycles for enabling the engine starting circuit of the vehicle during a period of sufficient duration to permit the driver to enter the vehicle and initiate the starting operation by actuation of the ignition switch.

11 Claims, 2 Drawing Figures

SAFE START SYSTEM FOR AUTOMOTIVE VEHICLES

BACKGROUND OF THE INVENTION

This invention relates to safety procedures for automotive vehicles.

Various safety programs and procedures are currently instituted in connection with automotive vehicles, particularly of the commercial and industrial types such as telephone utility vehicles, public equipment repairing vehicles, construction industry vehicles, etc. Such safety programs and procedures are utilized in an effort to avoid accident liability resulting from hazards in the immediate vicinity of the vehicles. For example, such accidents sometimes occur in surrounding relation to parked vehicles because of the presence of children, tricycles, and other obstructions of which the vehicle operator is not aware prior to operating the vehicle. For that reason, public utility companies will sometimes require that the vehicle operator place safety cones at the rear and/or front of the vehicle while parked and require the vehicle operator to circle the vehicle and inspect the immediate vicinity for hazards while removing the safety cones prior to operating the vehicle. While the use of such safety cones operates as a reminder to the vehicle operator to make the requisite safety inspection, it has been found that the rate of theft of such safety cones is high and that the use of such safety cones does not ensure diligence on the part of vehicle operators in performing the safety inspection duties.

Various vehicle safety systems have heretofore been proposed involving engine starting operation of the vehicle and/or the provision of alarms to discourage unauthorized starting of the vehicle engine. Remote control starting systems are also well known involving switch triggered, signal control of the starting circuit for the vehicle engine. However, none of such known systems are related to safety inspection programs and procedures so as to minimize accident producing hazards external to the vehicle.

It is therefore an important object of the present invention to provide a system through which the inspection of safety hazards externally of the vehicle by the vehicle operator is enforced without use of safety cones or other expensive reminders subject to theft.

SUMMARY OF THE INVENTION

In accordance with the present invention, at least two switch devices are mounted externally on an automotive vehicle at monitoring locations such as the front and rear of the vehicle in positions convenient for manual actuation by the vehicle operator after completing an inspection for hazards adjacent each of such locations. Actuation of such switch devices in sequence triggers associated timers having overlapping timing cycles of predetermined durations, such as 44 seconds. The period during which the timing cycles overlap, corresponds to the completion of a signal controlled circuit involving series connected, current control devices of the solid state type which in turn are connected in series with the ignition switch of the vehicle to the vehicle battery source of voltage. Completion of such circuit during the timing cycle overlap period, results in the flow of a signal current that is sensed and operative to switch another current controlling device to a conductive state for enabling the engine starting circuit of the vehicle. The duration of the time overlap period is such as to permit the vehicle operator after completing the hazard inspection to enter the vehicle, buckle the seat belt and initiate the vehicle starting operation by actuation of the ignition switch assembly. The engine starting circuit is otherwise disabled by the aforementioned series connected current control devices so as to prevent the vehicle operator from starting the vehicle unless and until external vehicle hazard inspection is completed as reflected by the sequential actuation of the switch devices at the monitoring locations on the vehicle.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
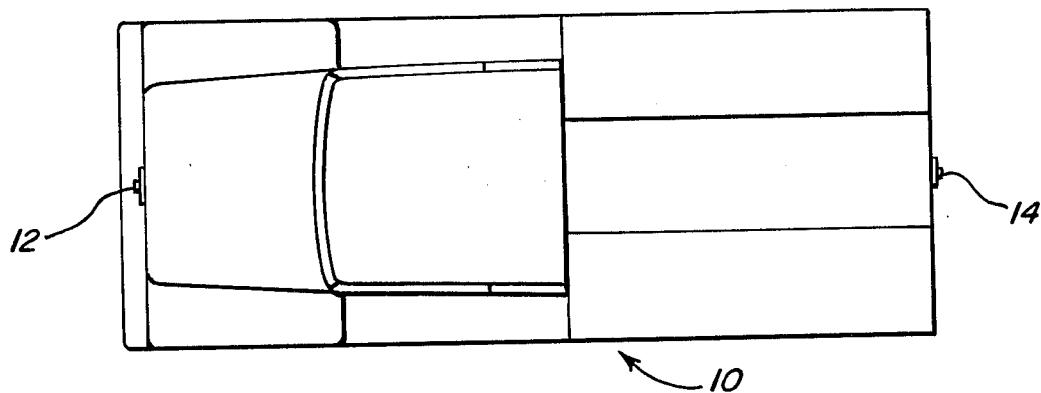
FIG. 1 is a simplified top plan view of a typical automotive vehicle with which the system of the present invention is associated.

Referring now to the drawings in detail, FIG. 1 illustrates by way of example an automotive vehicle generally referred to by reference numeral 10 such as a public utility repair truck. A plurality of manually operable switch devices such as a front switch 12 and a rear switch 14 are mounted externally on the vehicle body at the front end and the rear end. These switches are adapted to be manually actuated in sequence by the vehicle operator while hazard inspections are performed at the front and rear of the parked vehicle. It will of course be appreciated that additional switches may be mounted externally on the body of the vehicle if additional monitoring locations are to be established at which the vehicle operator performs hazard inspections while the vehicle is being circled for such purpose. Operation of the parked vehicle is disabled until all of the switch devices 12 and 14 are actuated in sequence. The sequential actuation of all of such switch devices enables operation through the engine starting circuit for a period of sufficient duration to permit the vehicle operator to enter the vehicle, buckle the seat belt and initiate the vehicle engine starting operation.

Figure 2:
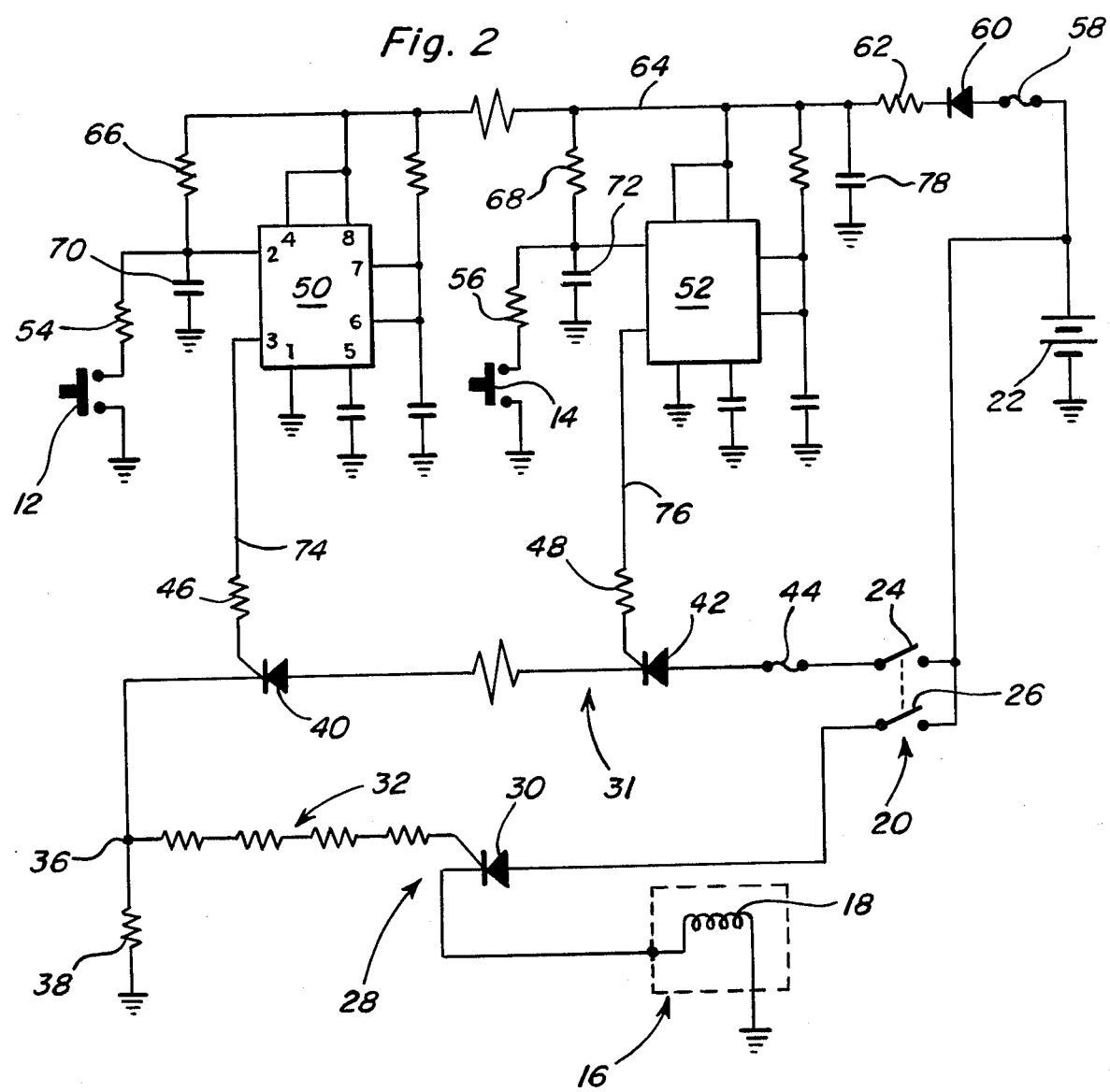
FIG. 2 is an electrical circuit diagram illustrating the system of the present invention.

FIG. 2 schematically illustrates a typical vehicle engine starting circuit 16 having a starter solenoid 18, the starter circuit being connected to the ignition switch assembly 20 of a conventional type also associated with the vehicle. The vehicle is also provided with the usual battery source of voltage 22 such as a 12 VDC battery connected to the ignition switch portion 24 of the ignition switch assembly which also includes a starter switch portion 26 through which the battery voltage source is connected to the starter circuit 16. The starter circuit in accordance with the present invention is modified so as to connect the starter solenoid in series with a current sensing disabling device generally referred to by reference numeral 28.

In the illustrated embodiment, the disabling device 28 is a silicone controlled rectifier (SCR) 30 the cathode of which is connected to the starter solenoid while the anode is connected to the voltage source 22 through a signal controlled circuit 31 and ignition switch assembly 20. Four series connected resistors 32 are connected between the gate electrode of the SCR 30 and a signal current sensing junction 36 separated from ground by a voltage dropping resistor 38. The SCR 30 is normally in non-conductive state with zero bias applied in order to disable operation of the vehicle engine starter circuit 16.

Junction 36 is connected to the signal controlled circuit 31 formed by series connected SCR 40 and 42 which in turn are connected by fuse 44 to the ignition switch portion 24. The SCR 40 and SCR 42 are signal controlled through their control electrodes. The SCR devices 40 and 42 are normally in their non-conductive states with zero bias applied to their gates so as to prevent the flow of current upon closing of the ignition switch portion 24. When the signal control devices 40 and 42 are simultaneously rendered conductive by biases applied through resistors 46 and 48, closing of the ignition switch portion 24 will conduct current to the junction 36 at which flow of the current is sensed to switch SCR 30 to its conductive state in order to enable the starter circuit 16. Only then will closing of the starter switch portion 26 of ignition switch 20 initiate vehicle engine operation. As long as the ignition switch is on to close portion 24 thereof, the SCRs 40 and 42 will continue to conduct.

The control gate electrodes of each of the signal controlled devices 40 and 42 is connected by its bias resistor 46 or 48 to an output terminal, such as pin 3, of an integrated timer circuit 50 or 52 of a commercially available type. Each of such timer circuits is arranged in a one shot circuit configuration wherein the manually operable switch device 12 or 14 is connected through a resistor 54 or 56 to the trigger input terminal, such as pin 2, of the integrated circuit 50 and 52. Operating voltage for the timer circuits is applied from the vehicle battery 22 through fuse 58, diode 60 and voltage reducing resistor 62 to operating voltage line 64 through which a relatively low standby current is conducted to avoid excessive energy drain from the battery. Resistors 66 and 68 are interconnected between the operating voltage line 64 and the input trigger lines from resistors 54 and 56. Filter capacitors 70 and 72 connected to the input trigger lines together with resistors 54, 56, 66 and 68 prevent false triggering. Once the timer is triggered into operation, the output signal lines 74 and 76 to the bias resistors 46 and 48 are raised to a logic 1 level of 12 VDC, for example. Such logic level is maintained for the duration of the timing cycle in order to render the associated signal control device 40 and 42 conductive.

The timer circuits are isolated against short duration transients by a filter formed by the resistor 62 and a capacitor 78 connected to the operating voltage line 64, while the diode 60 aforementioned, prevents damage to the circuit because of erroneous installation. The duration of the timing cycles associated with the timer circuits 50 and 52 is 44 seconds, for example. As a result of the described arrangement, the timing cycles of the timer circuits will overlap and the duration of the overlap period will vary from a minimum of 38 seconds to a maximum of 52 seconds with a typical duration of 44 seconds. The current demand during non-use of the engine will be between 6 and 20 milliamps. The minimum overlap period has been found sufficient to permit the vehicle driver to enter the vehicle, buckle in, and actuate the ignition-starter switch assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with an automotive vehicle having a body, a source of electrical energy, an engine and an engine starting circuit including a starter solenoid and an ignition switch connected to the electrical voltage source, a safe start system comprising a plurality of switch devices mounted on the body of the vehicle for actuation externally of the vehicle, signal controlled means connected to the starting circuit for normally preventing operation of the engine, and timing means connected to said switch devices and the signal controlled means for enabling the starting circuit through the signal controlled means in response to sequential actuation of said switch devices within a predetermined interval of time.

2. The system of claim 1 wherein said signal controlled means includes a plurality of time controlled switches connected in series with the ignition switch to the source and current sensing means enabling operation of the starting circuit in response to current conducted through the time-controlled switches.

3. The system of claim 2 wherein said timing means comprises a plurality of timer circuits respectively connected to said time-controlled switches for sequential closing thereof in response to said sequential actuation of the switch devices.

4. The system of claim 3 wherein each of said timer circuits has a timing cycle of predetermined duration during which the associated time-controlled switch is maintained closed.

5. The system of claim 4 wherein said current sensing means comprises a current conducting device connected in series with the starter solenoid, biasing means connected to the current conducting device for maintaining thereof in a non-conductive state, and signal current coupling means connecting the biasing means to the series connected time-controlled switches for switching the current conducting device to a conductive state.

6. The system of claim 2 wherein said current sensing means comprises a current conducting device connected in series with the starter solenoid and the ignition switch to the source, biasing means connected to the current conducting device for maintaining thereof in a non-conductive state, and signal current coupling means connecting the biasing means to the series connected time-controlled switches for switching the current conducting device to a conductive state.

7. The system of claim 1 wherein said timing means comprises a plurality of timer circuits respectively connected to said switch devices, said timer circuits having overlapping timing cycles of predetermined duration initiated by actuation of the switch devices associated therewith, and means for rendering the signal controlled means conductive during periods when all of said timing cycles overlap to enable operation of the starting circuit.

8. The system of claim 7 wherein the overlap periods have a duration during which entry of the vehicle and actuation of the ignition switch may be performed.

9. In combination with a plurality of manually actuated switch devices and a plurality of timers respectively triggered into operation by actuation of said switch devices, a method of operating the engine starting circuit of a vehicle having an ignition switch, including the steps of: externally inspecting the vehicle at a plurality of spaced monitoring locations; sequentially actuating said switch devices at said monitoring locations upon completion of the inspection; enabling the engine starting circuit during a period while the timing cycles of the triggered timers overlap; and entering the vehicle and actuating the ignition switch to effect operation of the enabled engine starting circuit following the sequential actuation of all of the switch devices before termination of the overlap period.

10. The method of claim 9 wherein said monitoring locations are established at the front and rear of the vehicle.

11. The method of claim 10 wherein said overlap period is of a duration to permit buckling of seat belts before actuation of the ignition switch and said termination of the overlap period.

* * * * *